United States Patent
Pettigrew

(10) Patent No.: US 7,170,262 B2
(45) Date of Patent: Jan. 30, 2007

(54) VARIABLE FREQUENCY POWER SYSTEM AND METHOD OF USE

(75) Inventor: Dana Robert Pettigrew, Calgary (CA)

(73) Assignee: Foundation Enterprises Ltd., Calgary (CA)

( * ) Notice: Subject to any disclaimer, the term of this patent is extended or adjusted under 35 U.S.C. 154(b) by 453 days.

(21) Appl. No.: 10/707,611

(22) Filed: Dec. 24, 2003

(65) Prior Publication Data

US 2005/0146221 A1    Jul. 7, 2005

(51) Int. Cl.
*H02P 9/00* (2006.01)
*H02P 7/00* (2006.01)
*H02P 25/30* (2006.01)
*H02H 7/06* (2006.01)
*F02D 29/06* (2006.01)

(52) U.S. Cl. .................. 322/32; 322/29; 290/40 C; 307/68; 318/157

(58) Field of Classification Search ............. 290/40 C; 307/68; 322/29, 32; 318/157
See application file for complete search history.

(56) References Cited

U.S. PATENT DOCUMENTS

| | | | | |
|---|---|---|---|---|
| RE29,579 E | * | 3/1978 | Simon ........................ | 307/68 |
| 4,322,630 A | * | 3/1982 | Mezera et al. ............ | 290/40 C |
| 4,857,755 A | * | 8/1989 | Comstock ................... | 307/47 |
| 5,013,929 A | * | 5/1991 | Dhyanchand ................ | 290/31 |
| 5,164,651 A | * | 11/1992 | Hu et al. .................... | 318/778 |
| 5,390,068 A | * | 2/1995 | Schultz et al. .............. | 361/95 |
| 6,198,176 B1 | * | 3/2001 | Gillette ....................... | 307/64 |
| 6,700,762 B2 | * | 3/2004 | Underwood et al. ........ | 361/56 |
| 6,820,728 B2 | * | 11/2004 | Raad .......................... | 188/267 |
| 6,921,985 B2 | * | 7/2005 | Janssen et al. .............. | 290/44 |
| 2003/0062775 A1 | * | 4/2003 | Sinha ......................... | 307/68 |
| 2004/0251748 A1 | * | 12/2004 | Inagaki et al. .............. | 310/14 |

* cited by examiner

*Primary Examiner*—Brian Sircus
*Assistant Examiner*—Hal I. Kaplan
(74) *Attorney, Agent, or Firm*—John J. Elnitski, Jr.

(57) ABSTRACT

A variable frequency power system with a power source having a rotating output and a speed control to regulate rotational speed of the rotating output. A generator coupled to and driven by the rotating output of the power source, whereby the speed control of the power source directly controls output power frequency of the generator due to control of rotational frequency of the rotating output. A voltage regulator connected between the generator and the motor regulates output voltage from the generator to the electrical motor load. A system controller controls output power frequency of the generator. The system controller interfaces with the speed control of the power source and configured to monitor generator output and operational conditions of the electrical motor load. The system controller adjusts the speed control based on generator output and operational conditions of the electrical motor load.

30 Claims, 3 Drawing Sheets

VARIABLE FREQUENCY POWER SYSTEM AND METHOD OF USE

BACKGROUND OF INVENTION

The present invention generally relates to providing variable electrical power to a three phase electrical motor. More specifically, the present invention relates to varying electrical power to a three phase electrical motor based on varying frequency input turning an electrical generator which provides electrical power to the motor, in order to overcome variable conditions encountered by the motor that require a variation in electrical power to the motor.

It is known to use three phase generators to supply the power to drive three phase motors. Normally, fixed power supply systems using three phase generators are operated at a constant speed to deliver three phase electrical energy of constant frequency to supply three phase power to three phase motors. There are currently two types of three phase fixed power supply systems in common use today. They are the 50 hertz and the 60 hertz power supply systems, which are used to drive electrical motors rated for 50 or 60 hertz operation, respectively. A problem with a single generator to supply power to a single motor system is that the large starting current required by the motor is normally overcome by sizing the generator as much as 40 percent larger than the main motor load to be applied to the generator. If the motor-generator combination is less than 40 percent larger than the main electrical motor to be started, then the engine driving the generator usually stalls out when attempting to start the motor. Another problem with fixed power supply systems is that these systems can not vary the frequency of the output power to the three phase motor, if it is required.

Some applications of three phase motors require a variable frequency output power to the motor, due to varying operational conditions required of the motor. An example is electrical submersible pumps used in the oil and gas industry at remote pumping stations. Typically, these pumps are located where there is an inadequate local electrical power grid supply or even no power grid supply and it is a common practice to use an engine to power the generator on the well site to supply power to the electric submersible pump motor. The engines are usually diesel, gasoline, natural gas, or propane powered. It is known that for any given centrifugal pump the rate and head capability of that pump is greatly expanded through the use of variable speed operation which is accomplished by providing power in the form of variable frequency power to the motor of the pump. This allows a pump to fit a larger process application due to varying conditions during the time that the pump is installed. In the oil and gas industry, a pump can be installed in a well for up to three or four years before being worn out and requiring a replacement. During this time, the production from an oil or gas well can change for a number of reasons due to varying conditions, the following are some examples. There is a decline in reservoir pressure due to depletion of the well. There is an increase in reservoir pressure due to voidage replacement from injection wells. There are changes in fluid produced, as usually oil is decreasing and water is increasing in a well. There could also be an increase or decrease in gas produced in the well, which would affect the fluid production of the well. There are mechanical problems with the wellbore, such as scaling or paraffin etc., which could cause a production decline. Chemicals can be used to remove these mechanical problems that restrict production without removing the pump, which will result in a production increase. These varying fluid production conditions can be accommodated by the varying of the power supply frequency to the motor of the pump to maximize oil production from wells.

When it is desired to operate a three phase motor at a variable speed the current method is to input the constant frequency three phase power from a generator to a three phase variable speed drive. Sometimes the variable speed drive is referred to as a variable frequency drive. The variable speed drive supplies three phase power at a variable frequency to the three phase motor. The variable speed drive allows the three phase motor to be operated at a variable speed in direct proportion to the variable frequency of the power supply from the variable speed drive. Sometimes a transformer is required between the variable speed drive and the three phase motor to provide a voltage match required by the three phase motor. FIG. 1 shows an example of currently used systems for generating three phase variable frequency power to a three phase motor. The system includes an engine, three phase electrical generator, excitation controller, variable speed drive, transformer, switchboard, motor controller and the motor. The engine speed is controlled by a governor to maintain constant engine speed under varying load conditions imposed by the generator load and a fifty or sixty Hertz output requirement. The engine is usually mechanically coupled to the electrical generator, but other connections are also used. The generator voltage output is controlled by the excitation controller. The output voltage of the generator is electrically connected by cables to the variable speed drive. The output of the variable speed drive is electrically connected by cables to the transformer. The transformer is normally of a multi-tap configuration to provide the appropriate voltage required by the motor. The multi-tap allows for numerous motor combinations to be used, which also makes it easier to accommodate the cable voltage loss associated with the wide range of cable sizes and lengths required to reach electric submersible pumps installed deep in oil & gas wells. A switchboard used as a power disconnect is connected along the cables between the transformer and the motor. A motor controller is an electronic unit used to control the frequency output of the variable speed drive as required by the motor based on feedback of varying conditions encountered by the motor. The motor controller also controls the on-off function of the switchboard. The motor controller is connected by cables to the switchboard, and by cables to the variable speed drive to monitor, control, and adjust the power to the motor by numerous programmed parameters.

There are many disadvantages to using a variable speed drive. Use of a variable speed drive reduces the electrical efficiency of the motor and creates harmonic spikes on the generated variable frequency power supplied to the motor. A variable speed drive reduces the power factor of the motor. A variable speed drive increases the waste heat generated in all the electrical equipment and wiring on the output side of the variable speed drive, including the transformer, wiring and the motor. A variable speed drive also requires more frequent maintenance compared to the rest of the electrical equipment in the system. Other disadvantages are associated with the engine, generator and transformer, when using a variable speed drive. The engine needs to be sized at least twenty percent larger than the motor load to accommodate the high electrical losses in the system. The transformer must have a larger number of multiple voltage taps to anticipate changes in motor and cable requirements, which requires a more expensive transformer. The transformer core also needs to be about twenty percent more massive than standard transformers to handle the harmonics and low frequency operation. The transformer also needs higher insulation rating on the wiring to handle the high voltage spikes due to harmonics. The generator also needs to be about twenty percent more massive than standard generators to handle the harmonics and low frequency operation. The generator also needs higher insulation rating on the wiring to handle the high voltage spikes due to harmonics.

It is an object of the present invention to provide a system and method to vary the electrical power to a three phase motor without the use of a variable speed drive between the generator and the motor.

SUMMARY OF INVENTION

A variable frequency power system with a power source having a rotating output and a speed control to regulate rotational speed of the rotating output. A generator coupled to and driven by the rotating output of the power source, whereby the speed control of the power source directly controls output power frequency of the generator due to control of rotational frequency of the rotating output. A voltage regulator connected between the generator and the motor to regulates output voltage from the generator to the electrical motor load. A system controller controls output power frequency of the generator. The system controller interfaces with the speed control of the power source and is configured to monitor generator output and operational conditions of the electrical motor load. The system controller adjusts the speed control based on generator output and operational conditions of the electrical motor load.

DETAILED DESCRIPTION

Figure 1:
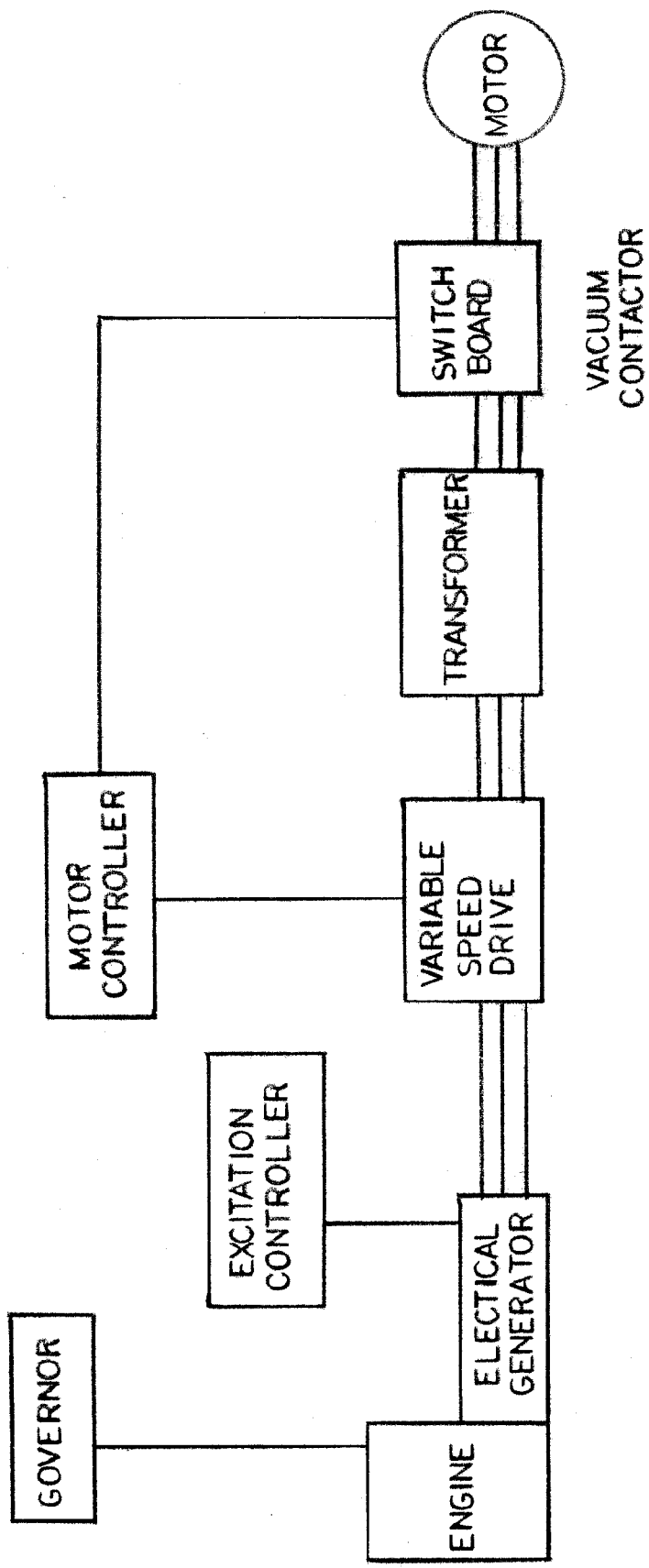
FIG. 1 is a schematic view of a power system with a variable speed drive.

The present invention is a variable frequency power system to drive a three phase electrical motor at the frequency, voltage and amperage, as required by the motor operation to drive a driven unit. The variable frequency power system of the present invention is especially applicable where the driven unit is an electric submersible pump used in the oil and gas industry. The electric submersible pump is driven by alternating current (AC) three phase electrical motor which exhibits a non-linear relationship between rotational speed and torque load due to the inherent characteristics of centrifugal pumping systems. The variable frequency power system includes a generator driven by a power source. The variable frequency power system includes a specially programmed logic circuit in a system controller, which interfaces with the power source of the generator. The programmed logic circuit is designed to monitor and control the driven unit by monitoring the conditions of the driven unit and controlling the supplied power to the motor. The system controller would be responsible for adjusting and monitoring the generator output, and would adjust the generator to any voltage and frequency required by the driven unit within the effective operational limits of the generator. Not only can this equipment allow for desired steady-state operational parameters, it can be set up to allow for completely different parameters during start-up of high power draw electrical devices, such as electric motors, or to react to monitored inputs of the driven unit. The system controller of the variable frequency power system controls the generator speed and output voltage, and is capable of accepting inputs from external sources to control the operation of the entire system. In the case of electric submersible pumps, current draw and pump operating pressures can be monitored and generator frequency and voltage can be automatically adjusted due to changes in those readings, including emergency shutdown of the pump, if needed. The variable frequency power system can also include a human-machine interface. The human-machine interface can include a display screen and input buttons to allow an operator the ability to select desired operational and startup routines, monitor operating system parameters, or modify operational parameters as needed without requiring in-depth knowledge of the underlying hardware and code of the system controller.

The variable frequency power system includes a power source, uninterrupted power supply, generator, excitation controller, system controller and switchboard. The power source drives the generator and is usually an engine, as is the case when powering a electric submersible pump in the oil and gas industry. The engine is designed and sized to operate continuously at the maximum power required by the motor. The engine includes a throttle that is regulated by the system controller. The uninterruptible power supply powers the instrumentation and control circuits of the system controller, excitation controller and all other electrical components in need of a constant electrical power source. Typically, the uninterruptible power supply is an inverter driven off of the engine battery or engine auxiliary battery, so that the electrical components are independent of the main power supply output of the generator. The generator provides electrical power to the motor. The excitation controller is used to adjust voltage output of the generator to the motor and also includes a programmable logic so that the voltage is adjusted according to the frequency of the engine-generator combination. Special logic circuit programs are used for startup and normal operational ranges. The system controller also includes programmed logic circuits, which monitor operation of the system and control the throttle on the engine. In the case of the electric submersible pump, the system controller would monitor pump operating conditions. The switchboard provides the stop/start function of the motor and is usually rated for the highest voltage and amp capacity required.

Figure 2:
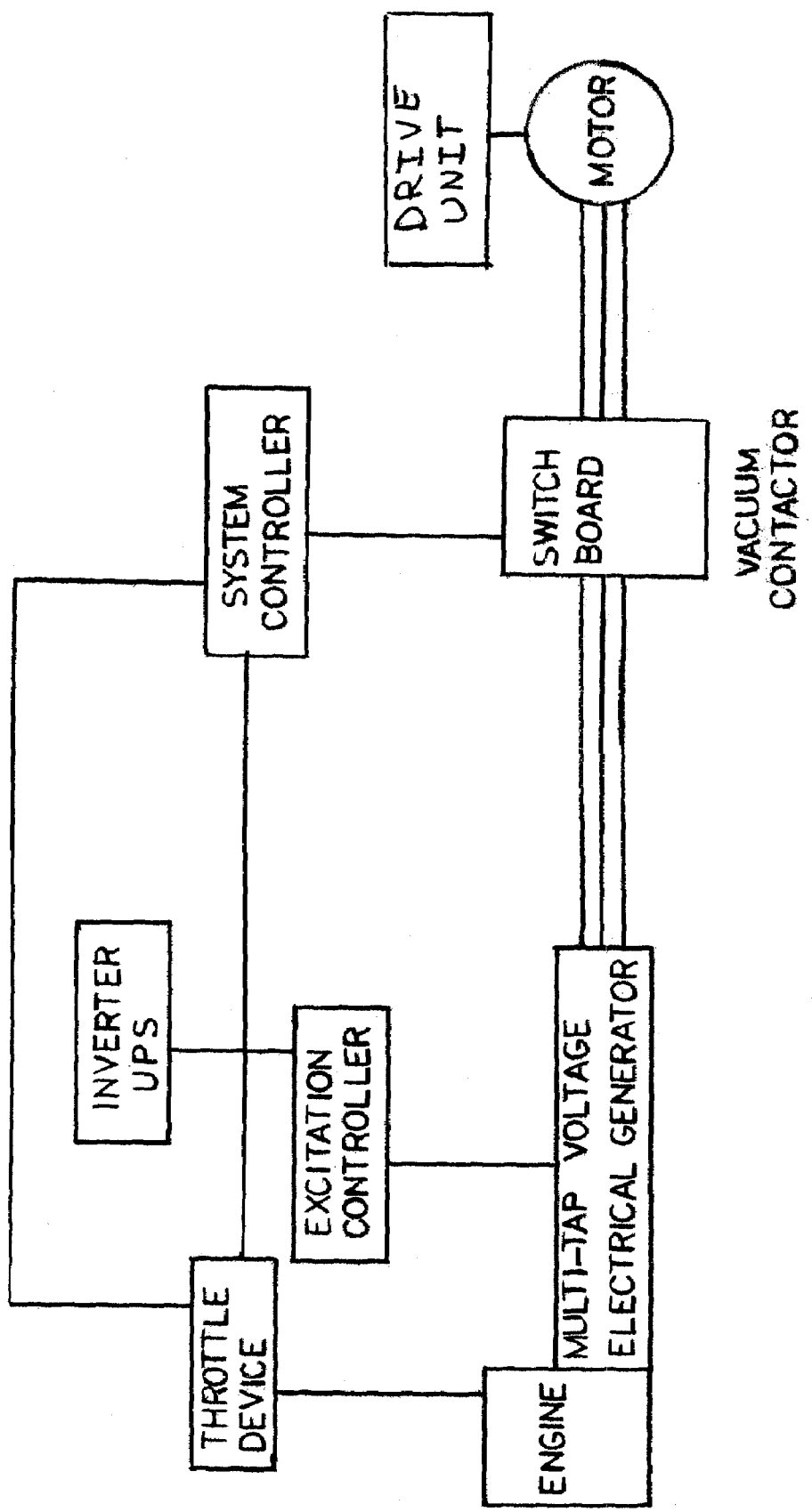
FIG. 2 is a schematic view a variable frequency power system according to the present invention.

FIG. 2 shows a system for generating three phase variable frequency power to a three phase motor. The system includes an engine with the engine speed controlled by a throttle device. The engine is mechanically coupled to a three phase electrical generator. The generator is shown as a multi-tap voltage generator. The voltage output of the generator is controlled by the excitation controller in order to provide the appropriate voltage required by the motor. A switchboard is used as a power disconnect between the electrical generator and the motor. A system controller is used to control the frequency output of the electrical generator by controlling the engine throttle device, speed control settings and also controls the on-off function of the switchboard. The variable frequency power system also includes an inverter which supplies a constant electrical power source for the instrumentation and control circuits for the throttle device, excitation controller and the system controller. The variable frequency power system controller is connected by cables to the switchboard and by cables to the engine to monitor, control and adjust the power to the motor by numerous programmed parameters in the system controller.

Figure 3:
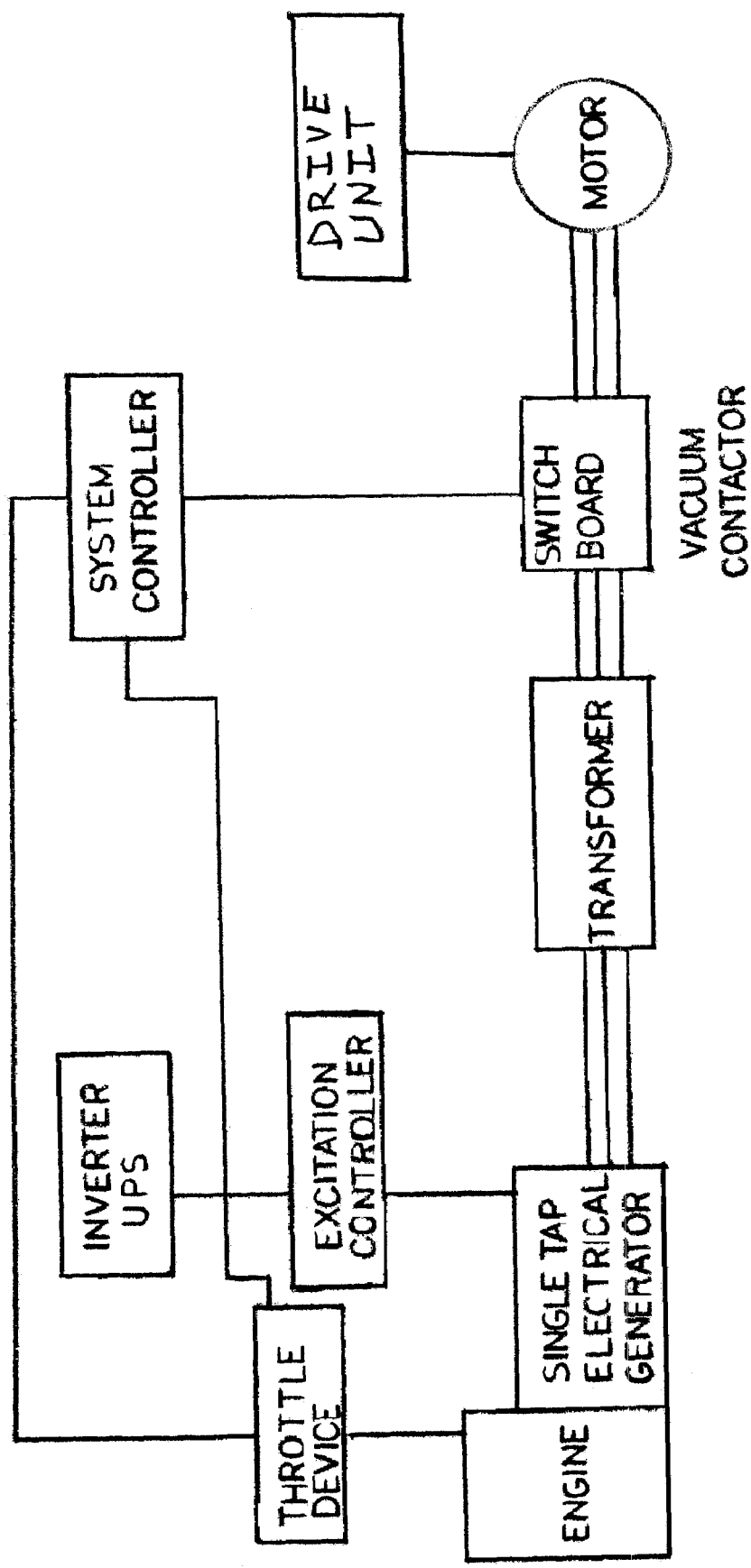
FIG. 3 is a schematic view a variable frequency power system according to the present invention.

FIG. 3 shows another embodiment of the present invention for generating three phase variable frequency power to a three phase motor. The system includes the engine, the engine throttle device and is mechanically coupled to a three phase electrical generator. In this case, the generator is shown as a single tap voltage configuration. The voltage output of the generator is controlled by the excitation controller. The output of the electrical generator is electrically connected to a transformer which is normally of a multi-tap configuration to provide the appropriate voltage required by the motor. The switchboard is used as a power disconnect between the transformer and the motor. The system controller is used to control the frequency output of the electrical generator by controlling the engine throttle device, control settings and also controls the on-off function of the switchboard. The variable frequency power system also includes the inverter which supplies a constant electrical power source for the instrumentation and control circuits for the throttle device, excitation controller and the system controller.

The engine rotates the three phase electrical generator designed for variable frequency operation. The generator is electrically coupled to the three phase motor. The throttle device is usually a combination of a throttle and electronic speed controller to control the speed of the engine, and thus control the turning frequency of the engine. An increase or decrease in engine speed would in turn increase or decrease the frequency of generated three phase power being supplied to the three phase motor by the generator. The excitation controller is a voltage regulator capable of varying its voltage output in a programmable manner to the engine speed driving the generator. The system controller interfaces with the throttle device and the excitation controller to monitor, control and regulate the desired operating parameters of the electric motor. The system controller adjusts the speed based on monitored readings and the desired operating conditions of the motor for any one particular drive unit application. The monitored readings can be from sensors at the motor or in the case of an electric submersible pump, at the pump itself. The uninterruptible power supply keeps the monitoring, control and adjustment functions operating during large changes in the frequency of the electrical power being generated to power the motor.

The generator can be set up with a single set of output voltage taps as shown in FIG. 3 or with multiple sets of output voltage taps as shown in FIG. 2. The use of multiple sets of output voltage taps at the generator eliminates the need for a separate transformer, which can be bulky and expensive, and yet allows for a wide range of output voltages to be produced. The operating voltage range of a generator with multiple sets of output voltage taps can be from several hundred volts to several thousand volts and can be generated at any frequency within the effective functional speed range of the motor-generator combination. Again, generator output is manipulated by the excitation controller, which allows the system controller to control and monitor the output voltage of the generator anywhere within the effective operational range of the selected output tap of the generator or transformer. A generator with multiple sets of output voltage taps can have a tap selection such as 1810, 2600 & 3640 volts or other suitable range of low, medium & high volts as is convenient to arrange during the manufacture of a given generator unit, which can be fine tuned by the excitation controller to supply the correct voltage in a range from 900–4200 volts to the motor for the operation conditions of the motor required by the drive unit. Also, a generator with multiple sets of output voltage taps can be fed into an external multiple tap transformer to achieve an even broader range of operational voltages, if required.

Since the output voltage of the variable frequency power system is monitored and controlled by the system controller, it is possible to adjust the output voltage of the generator independently of the output frequency. This flexibility allows the variable frequency power system to vary output voltage linearly with respect to frequency, or to maintain a fixed output voltage as frequency is varied depending on what is required by the load of the drive unit, a feature which is very useful during the initial starting of an electric submersible pump motor. The variable frequency power system allows the starting of high-load electrical equipment by controlling certain aspects of the engine-generator combination that was previously not possible to do accurately and consistently. The system controller of the variable frequency power system can control a startup sequence to start the engine-generator combination and run it at idle with no load for a specified warm-up period. Once warm-up is achieved, the system controller can begin a startup sequence by bringing the engine to a starting frequency, for example fifteen Hertz, and then give the engine the command to go to full throttle. As the engine ramps up in speed and reaches roughly half the final operating speed, the system controller engages the power to the motor of the drive unit. The final operating speed for many applications is expected to be in the 45 hertz to 60 hertz range. This start sequence eliminates the mechanical reaction time inherent to the existing engine-generator combination when a sharp electrical load is introduced. Another start up method that can be realized with the variable frequency power system is for devices with high startup power draws, by using a reduced startup voltage method. The system controller can control a startup sequence to start the engine-generator combination and run it at idle with no load for a specified warm-up period. Once warm-up is achieved, the variable frequency power system brings the engine to a steady operating frequency slightly below full operating frequency, for example approximately around eighty-five percent of full operating frequencies. Once up to speed, the variable frequency power system sets the excitation controller to a reduced output voltage in a range of fifty to ninety percent of the rated voltage to frequency ratio. At this point the system controller engages the power to the electrical motor of the driven device, holding the output voltage fixed at the preset reduced voltage regardless of engine speed change. After a given period of time elapses, the system controller instructs the excitation controller to ramp up the voltage to achieve the required volts to hertz ratio to be delivered to the motor based on the driven device. The system controller then waits until the system reaches steady operation at these settings before bringing the system to the final operational speed. This second start-up sequence takes advantage of the fact that the inertia of the engine and generator is sufficient such that the engine speed will be reduced while it picks up the additional load, but before the engine reaches a stall speed, it will recover and return to the required setting of the frequency selected for the power to be generated and delivered to the motor.

The variable frequency power system allows for start-up modes to be designed to take advantage of the fact that at low speeds of about thirty Hertz, or about one-half of its full speed, a diesel engine, or other similar engine driver, can produce up to fifty percent of its full load horsepower and up to sixty percent of its full load torque, while the electrical motor at this speed driving a centrifugal pump, only requires twenty-five percent of the horsepower of the engine. For the diesel engine to do this, the engine has to be at full throttle, so that the turbocharger is spooled up and giving the engine the required boost in power.

It is therefore envisioned that start-up needs can be configured as follows. Run the engine at no load for warm-up. Set the system controller for running the motor at desired speed or current limit desired. An immediate or slow ramp can be accommodated. When the system controller gives signal to start the motor, then engine needs to slow down to idle speed of about fifteen Hertz, and then receives the signal to go to the set speed, and while the engine is under full throttle and gaining speed, there after the switchboard engages the motor. About thirty Hertz would be a good point for engaging the motor. The engine will slow down slightly while picking up the motor load and then will continue on to its set speed or current setting for the motor.

The variable frequency power system has many advantages over systems using a variable speed drive. The advantages include increased electrical efficiency, no electrical harmonics, an increase in the electrical power factor, an increase in motor efficiency, an increase in motor loading capabilities, a decrease in motor operating temperature, and less electrical stress on the electrical insulation properties of the motor windings and all other electrical wires in the main cable and generator. Another benefit of the variable frequency power system is it allows for the implementation of new processes which negates the current practice of over sizing the engine or generator. The variable frequency power system results in a package which is smaller and therefore easier to transport, lowers capital costs, is up to twenty-five percent more energy efficient as a result of the elimination of the variable speed drive, harmonics and transformer, ultimately require less maintenance and provide of longer life of the system. In the case of electric submersible pumps used by the oil and gas industry, the incorporation of all these features into one package provides a system that can be used in remote locations without requiring the purchase of multiple devices which can be more expensive and much more bulky. The variable frequency power system includes the connection of the motor to an electrical centrifugal pump, an electrical fan or an electrical gas compressor pump.

While different embodiments of the invention have been described in detail herein, it will be appreciated by those skilled in the art that various modifications and alternatives to the embodiments could be developed in light of the overall teachings of the disclosure. Accordingly, the particular arrangements are illustrative only and are not limiting as to the scope of the invention that is to be given the full breadth of any and all equivalents thereof.

The invention claimed is:

1. A variable frequency power system for starting and powering an electrical motor load comprising:
    a power source with a rotating output, said power source having a speed control to regulate rotational speed of said rotating output, said rotational speed of said rotating output being rotational frequency of said rotating output;
    a generator coupled to and driven by said rotating output of said power source, whereby speed control of said power source directly controls output power frequency of said generator to produce a desired output frequency from said generator due to control of rotational frequency of said rotating output;
    a voltage regulator connected between said generator and the motor to regulate output voltage emanating from said generator for a supply voltage to an electrical motor load; and
    a system controller to control output power frequency of said generator to be said desired output frequency, said system controller connected to interface with said speed control of said power source; said system controller configured to monitor generator output and operational conditions of said electrical motor load, said system controller configured to adjust said speed control of said power source based on generator output and operational conditions of said electrical motor load to maintain said desired output frequency.

2. The variable frequency power system of claim 1, wherein said power source is an engine powered by a fuel source.

3. The variable frequency power system of claim 1, further including an uninterruptible power supply to power electronics of said variable frequency power system independently of said generator.

4. The variable frequency power system of claim 1, wherein said voltage regulator is an excitation controller which includes programmable logic so that voltage is adjusted according to rotational frequency of said engine and said generator.

5. The variable frequency power system of claim 1, wherein said generator is configured as a multi-tap voltage generator.

6. The variable frequency power system of claim 1, wherein said motor is connected to an electrical submersible pump.

7. The variable frequency power system of claim 1, further including a transformer between said generator and said electrical motor load.

8. The variable frequency power system of claim 1, further including a switchboard connected between said generator and said electrical motor load to act as a shutdown switch between said generator and said motor, said switchboard controlled by said system controller.

9. The variable frequency power system of claim 1, wherein said power source is an engine powered by a fuel source; and further including an uninterruptible power supply to power electronics of said variable frequency power system independently of said generator.

10. The variable frequency power system of claim 9, wherein said voltage regulator is an excitation controller which includes programmable logic so that voltage is adjusted according to rotational frequency of said engine and said generator.

11. The variable frequency power system of claim 9, further including a transformer between said generator and said electrical motor load.

12. The variable frequency power system of claim 9, further including a switchboard connected between said generator and said motor to act as a shutdown switch between said generator and said motor, said switchboard controlled by said system controller.

13. A method of controlling power and frequency of power supplied to an electrical motor load, using a variable frequency power system including a power source with a rotating output, the power source having a speed control to regulate rotational speed of the rotating output, the rotational speed of the rotating output being rotational frequency of the rotating output; a generator coupled to and driven by the rotating output of the power source, whereby speed control of the power source directly controls output power frequency of the generator to produce a desired output freqency from said generator due to control of rotational frequency of the rotating output; a voltage regulator connected between the generator and the motor to regulate output voltage emanating from the generator; and a system controller to control output power frequency of the generator to be the desired output frequency, the system controller connected to interface with the speed control of the power source; the system controller configured to monitor generator output and operational conditions of the motor, the system controller configured to adjust the speed control of the power source based on generator output and operational conditions of the motor to maintain the desired output frequency, comprising:

determining the proper frequency of power output from the generator which is required by the motor; and adjusting the speed of the power source to adjust the frequency of the power output of the generator by using the system controller to manipulate the speed control of the power source while monitoring the frequency of the power outputted from the generator, thereby controlling the frequency of the power outputted by the generator.

14. The method of claim 13, wherein said power source is an engine power by a fuel source.

15. The method of claim 13, further including an uninterruptible power supply to power electronics of said variable frequency power system independently of said generator.

16. The method of claim 13, further including monitoring operating conditions of a unit driven by the motor and adjusting the speed of the power source to adjust the frequency of the power output of the generator to the desired output frequency based on required power needs of the unit driven by the motor.

17. The method of claim 13, further including using the system controller to control a startup sequence to start the power source and generator combination by running the power source at idle with no load from the motor for a specified warm-up period, once warm-up is achieved, using the system controller to adjust the rotational output of the power source to a starting frequency, then using the system controller to adjust the rotational output of the power source to full speed, when the power source ramps up in rotational speed and reaches roughly half final operating rotational speed, using the system controller to engage power from the generator to the motor.

18. The method of claim 17, further including monitoring operating conditions of a unit driven by the motor and adjusting the speed of the power source to adjust the frequency of the power output of the generator based on required power needs of the unit driven by the motor.

19. The method of claim 13, wherein power is transferred from the generator to the motor when the rotational speed of the rotational output of the power source is at about thirty Hertz.

20. The method of claim 13, further including using the system controller to control a startup sequence of the power source and generator combination by running the power source at idle with no load from the motor for a specified warm-up period;

once warm-up is achieved, increasing the rotational speed of the rotating output of the power source to a steady operating frequency slightly below full operating frequency, while regulating output voltage from the generator at a reduced output voltage using the voltage regulator;

using the system controller to engage the power from the generator to the motor while holding the output voltage fixed at the reduced voltage regardless of change in rotational speed of the power source;

after a given period of time elapses, using the system controller to command the voltage regulator to ramp up the output voltage of the generator to achieve the required voltage to frequency ratio required by the motor; and finally waiting until the system reaches steady operation before bringing the power source to the final operational speed.

21. The method of claim 20, wherein the rotational speed of the rotating output of the power source before engaging power to the motor is set for the steady operating frequency is approximately around five-sixths of full operating frequencies.

22. The method of claim 20, wherein the reduced output voltage is about fifty to ninety percent the rated voltage required by the motor.

23. The method of claim 20, further including monitoring operating conditions of a unit driven by the motor and adjusting the speed of the power source to adjust the frequency of the power output of the generator based on required power needs of the unit driven by the motor.

24. The method of claim 13, further including using the system controller to control a startup sequence where normal operating range of the motor will be in a range of forty to sixty Hertz and a set point of the desired operational frequency of the outputted power is selected in the system controller; and using the system controller to return the power source to an idle speed after initial warm up and then setting the rotational speed of the power source at a higher set speed level, so that the power source gains speed and gets up to a speed of about thirty Hertz, before power is transferred from the generator to the motor.

25. The method of claim 24, further including monitoring operating conditions of a unit driven by the motor and adjusting the speed of the power source to adjust the frequency of the power output of the generator based on required power needs of the unit driven by the motor.

26. The method of claim 13, further including using the system controller to control a startup sequence of the power source and generator combination, where the normal operating range of the motor will be in a range of fifty to sixty Hertz and a set point of the desired operational frequency of the outputted power is selected in the system controller;

using the system controller set the rotational speed of the power source such that the rotational speed is sufficient to prevent stalling of the power source while the power source picks up motor load when the power is transferred from the generator to the motor; and allowing the power source to recover and return to the desired operational frequency setting selected for the power to be generated to the motor.

27. The method of claim 26, further including monitoring operating conditions of a unit driven by the motor and adjusting the speed of the power source to adjust the frequency of the power output of the generator based on required power needs of the unit driven by the motor.

28. The variable frequency power system of claim 1, wherein said motor is connected to an electrical centrifugal pump.

29. The variable frequency power system of claim 1, wherein said motor is connected to an electrical fan.

30. The variable frequency power system of claim 1, wherein said motor is connected to an electrical gas compressor pump.

* * * * *